United States Patent
Lutz et al.

(10) Patent No.: US 8,367,146 B2
(45) Date of Patent: Feb. 5, 2013

(54) CONFECTIONERY MADE FROM HERBAL MIXTURES

(75) Inventors: Christina Lutz, Laufen (CH); Felix Richterich, Arlesheim (CH)

(73) Assignee: Ricola AG, Laufen (CH)

( * ) Notice: Subject to any disclaimer, the term of this patent is extended or adjusted under 35 U.S.C. 154(b) by 1047 days.

(21) Appl. No.: 10/522,322

(22) PCT Filed: Jul. 24, 2003

(86) PCT No.: PCT/CH03/00504
§ 371 (c)(1),
(2), (4) Date: Mar. 16, 2005

(87) PCT Pub. No.: WO2004/010789
PCT Pub. Date: Feb. 5, 2004

(65) Prior Publication Data
US 2005/0260328 A1    Nov. 24, 2005

(30) Foreign Application Priority Data
Jul. 25, 2002 (WO) ............... PCT/CH02/00418

(51) Int. Cl.
*A23G 3/00* (2006.01)
(52) U.S. Cl. ..................... 426/660; 426/655
(58) Field of Classification Search ............ 426/548, 426/658–660, 655
See application file for complete search history.

(56) References Cited

U.S. PATENT DOCUMENTS

| | | | |
|---|---|---|---|
| 4,623,543 A | 11/1986 | Motegi et al. | |
| 4,980,169 A * | 12/1990 | Oppenheimer et al. | 424/439 |
| 5,338,809 A * | 8/1994 | Bell et al. | 426/5 |
| 6,352,713 B1 * | 3/2002 | Kirschner et al. | 424/441 |
| 2001/0002269 A1 * | 5/2001 | Zhao | 426/112 |
| 2002/0132037 A1 * | 9/2002 | Zhou | 426/658 |

FOREIGN PATENT DOCUMENTS

| | | | |
|---|---|---|---|
| EP | 0593774 | | 4/1994 |
| EP | 0686351 | | 12/1995 |
| GB | 1526020 | | 9/1978 |
| JP | 57068772 A | * | 4/1982 |
| JP | 09194370 A | * | 7/1997 |
| WO | WO 9103147 A | * | 3/1991 |

* cited by examiner

*Primary Examiner* — Jyoti Chawla
(74) *Attorney, Agent, or Firm* — Ladas & Parry LLP

(57) ABSTRACT

Confectionery made from herbal mixtures, comprising an extract from a mixture of several herbs, or a mixture of a corresponding number of extracts of at least one herb, with additionally an extract of *Stevia rebaudiana*. The above presents considerable advantages, in particular: a desired flavor change, sweetening with a high sweetening capacity, natural sweetening without additional calories, natural sweetening without causing caries and with a prophylactic effect on caries. The confectionery can be produced, whereby either the dry herbs are mixed, said mixture extracted and the extract optionally thickened, or a corresponding number of optionally thickened extracts of at least one of the dried herbs are combined with each other and the mixture thickened, whereupon the mixture obtained is mixed with optionally thickened extract of the dried herb *Stevia rebaudiana*, or the dried herbs and the dried herb from *Stevia rebaudiana* are mixed together, said mixture is extracted and the extract obtained is optionally thickened. The obtained mixture or the obtained optionally thickened extract is processed to give confectionery of the desired form. The confectionery can be in many forms, such as a conventional form and produced by conventional means.

22 Claims, No Drawings

CONFECTIONERY MADE FROM HERBAL MIXTURES

The present invention relates to confectionery articles based on herbal mixtures which comprise an extract of a mixture of a plurality of herbs or a mixture of a corresponding number of extracts from at least one herb.

A feature of the inventive confectionery articles is that they additionally comprise an extract of *Stevia rebaudiana* (Latin *Eupatorium rebaudianum*). This circumstance is associated with fundamental advantages, in particular the addition of an extract of *Stevia rebaudiana* has a surprising effect, since, in contrast to an addition of isolated stevioside, the constituent responsible for the sweetening power of *Stevia rebaudiana*, a taste change is produced in the confectionery articles, in which, it is not the taste of stevioside which becomes particularly prominent, but the overall taste changes;

a desired taste change results, in which case it is not the taste of *Stevia rebaudiana* which comes to the fore, but an overall taste underlining the herbs results;

a sweetening results with greater sweetening power (the leaves of *Stevia rebaudiana* are about 10-20 times sweeter than sugar, and the isolated sweetener stevioside is about 300 times sweeter than sugar!);

a natural sweetening results, without supplying calories;

a natural sweetening results without causing caries; and a caries-prophylactic effect occurs.

The plant *Stevia rebaudiana* (*Bertoni*) *Hemsl.* belongs to the family Compositae. In German, this plant is called "Süsstoffpflanze" [sweetener plant], and for the drug *Stevia rebaudianae folium*, the German name "Honigkrautblätter" [honey-herb leaves] is also used.

Highly numerous different partially very complex processes have already been described for the extraction and/or purification of stevioside, the constituent of *Stevia rebaudiana* responsible for the sweetening power. The use of such processes, however, is not necessary in the production of the inventive confectionery articles, because *Stevia rebaudiana* is used here as herb.

The particularly advantageous taste change of the inventive confectionery articles which results therefrom is distinguished, astonishingly, by the fact that a slightly astringent herbal-honey taste with fresh cooling finish results, and, depending on the form of the inventive confectionery article (for example, hard sweet, drink, syrup), the time course of the taste development can be different. This is not the case with addition of isolated stevioside: here, as expected, a sweet licorice-like taste results.

In a first aspect, the present invention relates to confectionery articles in non-liquid form based on herbal mixtures comprising an extract of a mixture of a plurality of herbs or a mixture of a corresponding number of extracts of at least one herb, which are characterized in that they additionally comprise an extract of *Stevia rebaudiana*.

In a second aspect, the present invention relates to confectionery articles in the form of syrup based on herbal mixtures comprising an extract of a mixture of a plurality of herbs or a mixture of a corresponding number of extracts of at least one herb, which are characterized in that they additionally comprise an extract of *Stevia rebaudiana*.

In a further aspect, the present invention relates to confectionery articles based on herbal mixtures comprising an extract of a mixture of the herbs peppermint, sage, yarrow and thyme or a mixture of a corresponding number of extracts of at least one of these herbs, which are characterized in that they additionally comprise an extract of *Stevia rebaudiana*.

The inventive confectionery articles can be produced by either mixing the dried herbs, extracting this mixture and, if appropriate, thickening the extract; or mixing a corresponding number of, if appropriate, thickened extracts of at least one of the dried herbs with one another and, if appropriate, thickening the mixture; afterwards mixing the resultant mixture with, if appropriate, thickened extract of the dried herb *Stevia rebaudiana;* or mixing the dried herbs and the dried herb of *Stevia rebaudiana* with one another, extracting this mixture and, if appropriate, thickening the extract;

afterwards processing the resultant mixture or the resultant, if appropriate, thickened extract to give confectionery articles of the desired form.

Expediently, all herbs which are to be taken into account in a certain inventive confectionery article are mixed with one another in dried form and with dried herb *Stevia rebaudiana*, whereupon they are then extracted and the extract is, if appropriate, thickened; or, firstly all of these herbs are mixed with one another in dried form, whereupon they are then extracted and the extract is, if appropriate, thickened, and secondly the dried herb *Stevia rebaudiana* is extracted and the extract is, if appropriate, thickened, whereupon both the, if appropriate, thickened extracts are mixed with one another.

The dried herbs are expediently extracted by means of water, the dried herb *Stevia rebaudiana* is expediently extracted likewise by means of water, and a mixture of the dried herbs with the dried herb *Stevia rebaudiana* is also expediently extracted by means of water. In addition to water, of course, other solvents can be used, for example lower alkanols (that is to say $C_1$-$C_6$-alkanols), preferably ethanol, or mixtures of such alkanols with water.

If the extracts are thickened, they are expediently reduced to about 1/30 to about 1/36, in particular to about 1/33, of their volume. The extracts, however, can also be processed to form confectionery articles without preceding thickening, as what are termed tea extracts; in this case, in the production of the inventive confectionery articles, instead of water and thickened extracts, such tea extracts are used.

For the inventive confectionery articles in non-liquid form and in the form of syrup, expediently the following herbs are used as base:

peppermint (*Mentha piperita* L.);
sage (*Salvia officinalis* L.);
yarrow (*Achillea millefolium* L.); and
thyme (*Thymus vulgaris* L.);

the inventive confectionery articles which are not distinguished by their form (in non-liquid form or in the form of syrup) must be based on a mixture of these four herbs.

In addition to these four herbs, in all inventive confectionery articles, use can also be made of lemon balm (*Melissa officinalis* L.)

and/or with advantage also one or more of the following herbs:

common plantain (*Plantago major* L.);
marshmallow (*Althaea officinalis* L.);
lady's mantle (*Alchemilla vulgaris* L.);
elder (*Sambucus ebulus* L.);
cowslip (*Primula veris* L.);
anise (*Pimpinella anisum* L.);
speedwell (*Veronica officinalis* L.);
mallow (*Malva sylvestris* L.); and
horehound (*Marrubium vulgare* L.).

The inventive confectionery articles can be present in various non-liquid forms which are customary per se, for example in the form of hard sweets, for example in the from of solid or filled hard sweets, which have been stamped, cast, molded or pressed and during the sucking of which, a honey-like herbal flavor slowly forms;

in rubber-like consistency or structure, for example in the form of piece-like solid or filled sweets, which have been cast, molded, stamped or pressed, and during the slow chewing of which, a typical herbal flavor rapidly develops;

in the form of chewing sweets; or in the form of chewing gum.

Furthermore, the inventive confectionery articles, as mentioned above, can be present in the form of syrup.

The inventive confectionery articles which are not distinguished by their form (in non-liquid form or in the form of syrup), but are distinguished by the use of the four herbs peppermint, sage, yarrow and thyme, can be present in all of the above discussed forms and, furthermore, can also be prepared in the form of herbal drinks, for example in a form from which instant drinks can be prepared.

Such forms are produced in a manner which is conventional and familiar to all those skilled in the art.

The examples hereinafter are intended to explain the invention in more detail, but not to restrict its scope in any way.

EXAMPLE 1

One part by weight of a mixture of the five dried herbs peppermint (30%), lemon balm (25%), sage (20%), yarrow (15%) and thyme (10%) is extracted with water and the extract is thickened to 1/33 of its volume.

Separately, one part by weight of dried herb of *Stevia rebaudiana* is extracted with water, and the extract is thickened to 1/33 of its volume.

The thickened extract of the five herbs and the thickened Stevia extract are mixed in the ratio 1:1.

This mixture can be processed to a hard sweet as described in example 3.

EXAMPLE 2

One part by weight of a mixture of the five dried herbs peppermint (30%), lemon balm (25%), sage (20%), yarrow (15%) and thyme (10%) is mixed with three parts by weight of dried herb of *Stevia rebaudiana*. The mixture is extracted with water and the extract is thickened to 1/33 of its volume.

This extract can be processed, as described in example 4, to give a rubber-like confectionery article.

EXAMPLE 3

Production of a Herbal Hard Sweet

Sugar and glucose syrup are dissolved in water, boiled and subjected to vacuum, whereupon the mixture obtained according to example 1, aromas and acidulant are folded into the boiled sugar mass. Mixing is performed at boiling temperature, the mixture is allowed to cool and the cooled mass is stamped to form hard sweets.

EXAMPLE 4

Production of a Rubber-Like Herbal Confectionery Article

Gum arabic and sorbitol syrup are dissolved in water. The mixture is heated to boiling, the extract obtained according to example 2 and also aromas and acidulant are added and mixed. The mixture is poured into suitable molds, whereupon the resultant molded pieces are allowed to cool and dry, powdered and polished.

The invention claimed is:

1. A herbal mixture for a confectionery article, which mixture consists of:
   (i) an extract of the herb (A);
   (ii) an extract of the herb (B);
   (iii) an extract of the herb (C);
   (iv) an extract of the herb (D);
   (v) an extract of the herb (E);
   (vi) an extract of common plantain;
   (vii) an extract of marshmallow;
   (viii) an extract of lady's mantle;
   (ix) an extract of elder;
   (x) an extract of cowslip;
   (xi) an extract of anise;
   (xii) an extract of speedwell;
   (xiii) an extract of mallow; and
   (xiv) an extract of horehound,
   the said extracts (i), (ii), (iii), (iv) and (v) being either
   (1) a single extract of a mixture of the five herbs (A), (B), (C), (D) and (E); or
   (2) a mixture of two extracts, consisting of the extract of one of the five herbs (A), (B), (C), (D) and (E) and the extract of a mixture of the remaining four of the five herbs (A), (B), (C), (D) and (E); or
   (3) a mixture of two extracts, consisting of the extract of a mixture of two of the five herbs (A), (B), (C), (D) and (E) and the extract of a mixture of the remaining three of the five herbs (A), (B), (C), (D) and (E); or
   (4) a mixture of three extracts, consisting of the extract of one of the five herbs (A), (B), (C), (D) and (E), the extract of one of the remaining four of the five herbs (A), (B), (C), (D) and (E) and the extract of a mixture of the still remaining three of the five herbs (A), (B), (C), (D) and (E); or
   (5) a mixture of three extracts, consisting of the extract of one of the five herbs (A), (B), (C), (D) and (E), the extract of a mixture of two of the remaining four of the five herbs (A), (B), (C), (D) and (E) and the extract of a mixture of the still remaining two of the five herbs (A), (B), (C), (D) and (E); or
   (6) a mixture of four extracts, consisting of the extract of a mixture of two of the five herbs (A), (B), (C), (D) and (E) and three extracts each being the extract of a different one of the remaining three of the five herbs (A), (B), (C), (D) and (E); or
   (7) a mixture of five extracts each being the extract of a different one of the five herbs (A), (B), (C), (D) and (E),
   said herb (A) being peppermint;
   said herb (B) being sage;
   said herb (C) being yarrow;
   said herb (D) being thyme; and
   said herb (E) being *Stevia rebaudiana*.

2. The mixture according to claim 1, wherein the confectionery article is in non-liquid form.

3. The mixture according to claim 2, wherein the confectionery article is in the form of a hard sweet.

4. The mixture according to claim 3, wherein the confectionery article is in the form of a solid or filled hard sweet, which has been stamped, cast, molded or pressed.

5. The mixture according to claim 2, wherein the confectionery article is in rubber-like consistency or structure.

6. The mixture according to claim 5, wherein the confectionery article is in the form of a piece-like solid or filled sweet, which has been stamped, cast, molded or pressed.

7. The mixture according to claim 2, wherein the confectionery article is in the form of a chewing sweet.

8. The mixture according to claim 2, wherein the confectionery article is in the form of a chewing gum.

9. The mixture according to claim 2, wherein the confectionery article is in a form, from which an instant drink can be prepared.

10. The mixture according to claim 1, wherein the confectionery article is in the form of a syrup.

11. A method for producing the mixture as defined in claim 1 comprising the steps of:
optionally mixing the dried herbs leading to the ingredients (i) to (xiv);
extracting these, optionally mixed, herbs;
optionally thickening the resulting extract(s); and
optionally mixing these, optionally thickened, extracts.

12. A herbal mixture for a confectionery article, which mixture consists of:
(i) an extract of the herb (A);
(ii) an extract of the herb (B);
(iii) an extract of the herb (C);
(iv) an extract of the herb (D);
(v) an extract of the herb (E);
(vi) an extract of lemon balm;
(vii) an extract of common plantain;
(viii) an extract of marshmallow;
(ix) an extract of lady's mantle;
(x) an extract of elder;
(xi) an extract of cowslip;
(xii) an extract of anise;
(xiii) an extract of speedwell;
(xiv) an extract of mallow; and
(xv) an extract of horehound,
the said extracts (i), (ii), (iii), (iv) and (v) being either
(1) a single extract of a mixture of the five herbs (A), (B), (C), (D) and (E); or
(2) a mixture of two extracts, consisting of the extract of one of the five herbs (A), (B), (C), (D) and (E) and the extract of a mixture of the remaining four of the five herbs (A), (B), (C), (D) and (E); or
(3) a mixture of two extracts, consisting of the extract of a mixture of two of the five herbs (A), (B), (C), (D) and (E) and the extract of a mixture of the remaining three of the five herbs (A), (B), (C), (D) and (E); or
(4) a mixture of three extracts, consisting of the extract of one of the five herbs (A), (B), (C), (D) and (E), the extract of one of the remaining four of the five herbs (A), (B), (C), (D) and (E) and the extract of a mixture of the still remaining three of the five herbs (A), (B), (C), (D) and (E); or
(5) a mixture of three extracts, consisting of the extract of one of the five herbs (A), (B), (C), (D) and (E), the extract of a mixture of two of the remaining four of the five herbs (A), (B), (C), (D) and (E) and the extract of a mixture of the still remaining two of the five herbs (A), (B), (C), (D) and (E); or
(6) a mixture of four extracts, consisting of the extract of a mixture of two of the five herbs (A), (B), (C), (D) and (E) and three extracts each being the extract of a different one of the remaining three of the five herbs (A), (B), (C), (D) and (E); or
(7) a mixture of five extracts each being the extract of a different one of the five herbs (A), (B), (C), (D) and (E),
said herb (A) being peppermint;
said herb (B) being sage;
said herb (C) being yarrow;
said herb (D) being thyme; and
said herb (E) being *Stevia rebaudiana*.

13. The mixture according to claim 12, wherein the confectionery article is in non-liquid form.

14. The mixture according to claim 13, wherein the confectionery article is in the form of a hard sweet.

15. The mixture according to claim 14, wherein the confectionery article is in the form of a solid or filled hard sweet, which has been stamped, cast, molded or pressed.

16. The mixture according to claim 13, wherein the confectionery article is in rubber-like consistency or structure.

17. The mixture according to claim 16, wherein the confectionery article is in the form of a piece-like solid or filled sweet, which has been stamped, cast, molded or pressed.

18. The mixture according to claim 13, wherein the confectionery article is in the form of a chewing sweet.

19. The mixture according to claim 13, wherein the confectionery article is in the form of a chewing gum.

20. The mixture according to claim 13, wherein the confectionery article is in a form, from which an instant drink can be prepared.

21. The mixture according to claim 12, wherein the confectionery article is in the form of a syrup.

22. A method for producing the mixture as defined in claim 12 comprising the steps of:
optionally mixing the dried herbs leading to the ingredients (i) to (xv);
extracting these, optionally mixed, herbs;
optionally thickening the resulting extract(s); and
optionally mixing these, optionally thickened, extracts.

* * * * *